D. T. WARD.
Churn.
No. 51,246.
Patented Nov. 28, 1865.
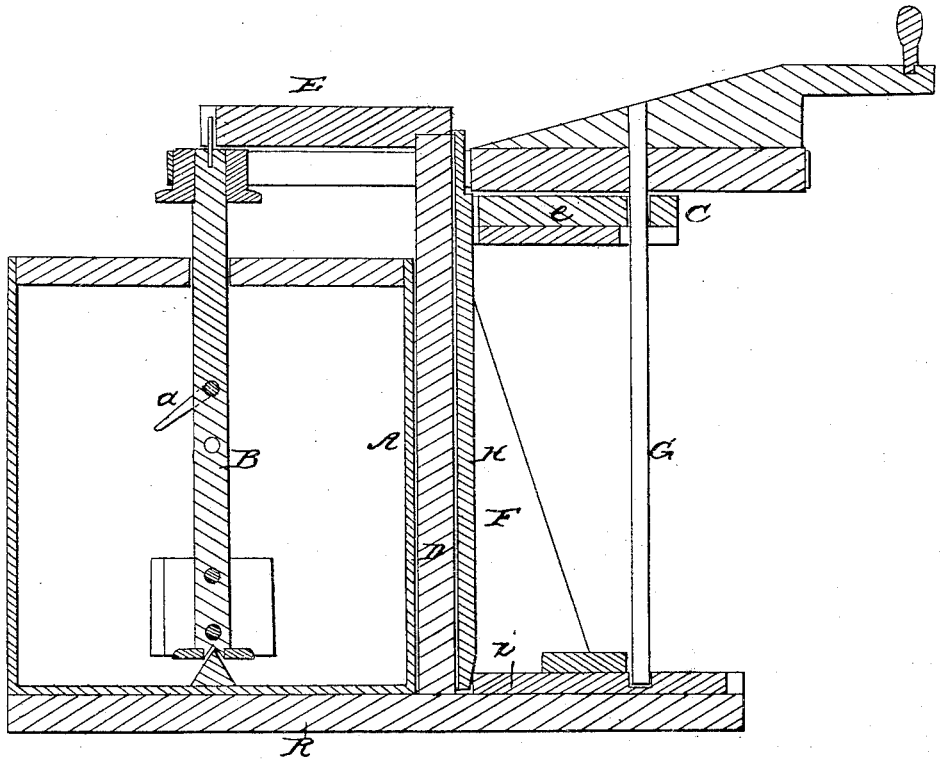
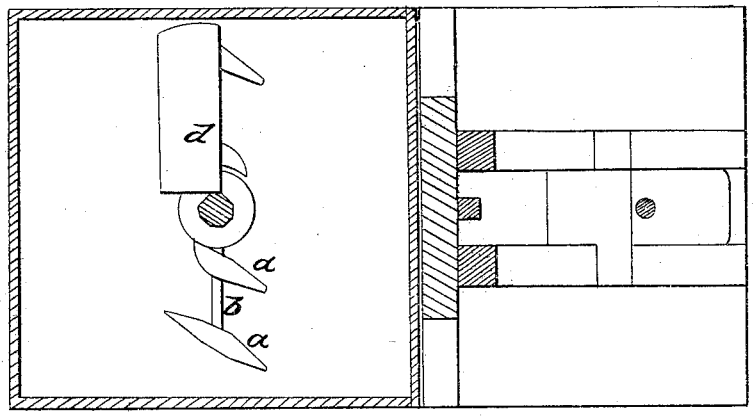
Witnesses:
Inventor:
D. T. Ward

UNITED STATES PATENT OFFICE.

D. T. WARD, OF CARDINGTON, OHIO.

IMPROVEMENT IN CHURNS.

Specification forming part of Letters Patent No. 51,246, dated November 28, 1865.

*To all whom it may concern:*

Be it known that I, D. T. WARD, of Cardington, in the county of Morrow and State of Ohio, have invented certain new and useful Improvements in Churns; and I do hereby declare that the following is a full, clear, and exact description of the same, reference being had to the accompanying drawing, and to the letters of reference marked thereon.

In the annexed drawing, making part of this specification, A represents the churn, which is made square and in any of the known and usual ways.

B represents the dasher-shaft, which stands in a vertical position. Said shaft has a socket in its end, into which passes a conical pin, which is firmly attached to the center and bottom of the churn. The upper portion of the dasher-shaft is provided with a journal, which works in a groove or bearing in the end of arm E.

*b b* represents two rods, which pass through the dasher-shaft, and to which the dashers are secured. The dashers *a a* are attached to the rods *b b* at an angle, as shown, so that the milk or cream will be thrown outward from the center against the sides of the churn.

*d* represents a wing, which can be secured to the dasher-shaft at any height to suit the milk. The position of the wing *d* is shown in the figure, and is used for the purpose of gathering the butter.

R represents the platform upon which the churn stands, and upon this platform is erected a broad standard, D, which is supported by the braces F. Near the upper ends of the standard D is an arm, C, which projects on the side opposite the churn. In grooves in the arm C is placed a slide, *e*, and through the slide *e* passes a shaft, G. The lower end of the shaft G rests in and upon a slide, *i*, which said slide moves and rests upon the platform R, between two strips made to keep it in place. To the upper end of the shaft G is secured a wheel, which is provided with a crank-handle. A belt passes around this wheel and a pulley upon the dasher-shaft in order to give motion to said shaft from the wheel on shaft G.

H represents a long wedge or strip, which passes down by the side of the standard D and moves both of the slides *e* and *i*, thus moving the shaft G and tightening, when necessary, the band which passes from the wheel on shaft G to the pulley on the dasher-shaft. This arrangement is very important when I use a larger or smaller pulley upon the dasher-shaft, for in this case I do not find it necessary to cut my belt.

Having thus fully described my invention, what I claim as new, and desire to secure by Letters Patent, is—

The arrangement of the dasher-shaft with the wing *d*, the rods *b b*, and the dashers *a a*, as and for the purpose specified.

D. T. WARD.

Witnesses:
C. M. ALEXANDER,
J. M. MASON.